United States Patent
Higuchi et al.

(10) Patent No.: US 10,131,197 B2
(45) Date of Patent: Nov. 20, 2018

(54) ELECTRIC VEHICLE AIR-CONDITIONING DEVICE

(71) Applicant: DENSO CORPORATION, Kariya, Aichi-pref. (JP)

(72) Inventors: Terukazu Higuchi, Okazaki (JP); Yoshinori Yanagimachi, Takahama (JP); Yasuhiro Yokoo, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 466 days.

(21) Appl. No.: 14/411,146

(22) PCT Filed: May 28, 2013

(86) PCT No.: PCT/JP2013/003360
§ 371 (c)(1),
(2) Date: Dec. 24, 2014

(87) PCT Pub. No.: WO2014/002377
PCT Pub. Date: Jan. 3, 2014

(65) Prior Publication Data
US 2015/0183291 A1    Jul. 2, 2015

(30) Foreign Application Priority Data

Jun. 29, 2012 (JP) ................................ 2012-146537

(51) Int. Cl.
*B60H 1/00* (2006.01)
*B60H 1/32* (2006.01)

(52) U.S. Cl.
CPC ..... *B60H 1/00392* (2013.01); *B60H 1/00428* (2013.01); *B60H 1/00764* (2013.01);
(Continued)

(58) Field of Classification Search
CPC ............ B60H 1/00392; B60H 1/00428; B60H 1/00785; B60H 1/00849
(Continued)

(56) References Cited

U.S. PATENT DOCUMENTS

| 4,435,648 A | * | 3/1984 | Goode, III | ........... B60Q 1/1407 |
| | | | | 307/10.1 |
| 5,275,012 A | * | 1/1994 | Dage | .................. B60H 1/00392 |
| | | | | 219/202 |

(Continued)

FOREIGN PATENT DOCUMENTS

| JP | S6253384 B2 | 11/1987 |
| JP | H08332831 A | 12/1996 |

(Continued)

OTHER PUBLICATIONS

International Search Report (in Japanese with English Translation) dated Jul. 2, 2013 in the corresponding International Application No. PCT/JP2013/003360.
(Continued)

*Primary Examiner* — Henry Crenshaw
(74) *Attorney, Agent, or Firm* — Harness, Dickey & Pierce, P.L.C.

(57) ABSTRACT

When a battery control unit allows use of the electric compressor, an air conditioning control unit performs air-conditioning of a cabin in such a manner that the air conditioning control unit controls the electric compressor to be operated. When the battery control unit prevents use of the electric compressor, the air conditioning control unit controls the electric compressor to be stopped. In addition, the air conditioning control unit heats a windshield in such a manner that the air conditioning control unit controls a window heater to be operated. Accordingly, even when the electric compressor is stopped, fogging of the windshield is suppressed. The air conditioning control unit does not give
(Continued)

an excessive feeling of discomfort or unease to a user, because the air conditioning control unit continuously performs a normal air-conditioning control. Fogging of the windshield can be suppressed in a state where power consumption relative to a battery is suppressed.

12 Claims, 6 Drawing Sheets

(52) U.S. Cl.
CPC ..... B60H 1/00785 (2013.01); B60H 1/00849 (2013.01); B60H 1/00885 (2013.01); B60H 1/3208 (2013.01)

(58) Field of Classification Search
USPC .......................................................... 62/150
See application file for complete search history.

(56) References Cited

U.S. PATENT DOCUMENTS

| | | | |
|---|---|---|---|
| 5,305,613 A * | 4/1994 | Hotta | B60H 1/00392 180/65.1 |
| 5,705,859 A * | 1/1998 | Karg | B60K 1/02 180/65.245 |
| 5,717,387 A * | 2/1998 | Suman | B60R 25/00 340/7.2 |
| 5,729,989 A | 3/1998 | Sunaga et al. | |
| 5,876,277 A | 3/1999 | Uemura et al. | |
| 2001/0015070 A1* | 8/2001 | Hara | B60H 1/3208 62/133 |
| 2004/0168454 A1* | 9/2004 | Iritani | B60H 1/004 62/230 |

FOREIGN PATENT DOCUMENTS

| | | | |
|---|---|---|---|
| JP | H11192831 A | | 7/1999 |
| JP | 2000142078 A | | 5/2000 |
| JP | 2002120545 A | * | 4/2002 |
| JP | 2002120545 A | | 4/2002 |
| JP | 2007331691 A | | 12/2007 |
| JP | 2008137599 A | | 6/2008 |

OTHER PUBLICATIONS

Written Opinion (in Japanese with English Translation) dated Jul. 2, 2013 in the corresponding International Application No. PCT/JP2013/003360.
U.S. Appl. No. 14/411,149, Higuchi et al, filed Dec. 24, 2014.

* cited by examiner

ELECTRIC VEHICLE AIR-CONDITIONING DEVICE

CROSS-REFERENCE TO RELATED APPLICATIONS

This application is a U.S. National Phase Application under 35 U.S.C. 371 of International Application No. PCT/JP2013/003360 filed on May 28, 2013 and published in Japanese as WO 2014/002377 A1 on Jan. 3, 2014. This application is based on and claims the benefit of priority from Japanese patent application No. 2012-146537 filed on Jun. 29, 2012. The entire disclosures of all of the above applications are incorporated herein by reference.

The present application is based on Japanese patent application No. 2012-146537 filed on Jun. 29, 2012, the content of which is incorporated herein by reference.

TECHNICAL FIELD

The present disclosure relates to an air-conditioning device mounted on an electric vehicle.

BACKGROUND ART

An air-conditioning device for an electric vehicle, such as an electric car and a hybrid car, has been disclosed in PATENT LITERATURE 1. The disclosed device provides an air conditioning control for suppressing fogging of a window. When, for example, remaining power of a battery is small, the disclosed device executes control in which the operation rate of a compressor of a refrigeration circuit is suppressed and, further, a defroster outlet port is likely to be opened.

In the related art, the defroster outlet port is selected immediately after the compressor is stopped. As a result, air containing water-vapor evaporated from an evaporator is blown to a windshield.

PRIOR ART LITERATURE

Patent Literature

Patent Literature 1: JP 2002-120545 A

SUMMARY OF THE INVENTION

According to the study by the inventor of the present application, when the remaining power of the battery is low, the function of the air-conditioning device of the related art may be restricted, for example, the compressor may be stopped and the defroster outlet port may be likely to be selected. Such a functional restriction gives to a user of a vehicle an excessive feeling of discomfort or unease.

From the viewpoint described above, further improvements are required to the electric vehicle air-conditioning device.

It is an object of the disclosure is to provide an electric vehicle air-conditioning device which can suppress power consumption relative to a high voltage battery of an electric vehicle and can suppress fogging of a windshield, at the same time.

It is another object of the disclosure is to provide an electric vehicle air-conditioning device which does not give to a user an excessive feeling of discomfort or unease, even in a state where an electric compressor is stopped to suppress power consumption relative to a high voltage battery of an electric vehicle.

According to an aspect of the present disclosure, an air-conditioning device includes a refrigeration circuit having an electric compressor to which electric-power is supplied from a high voltage battery, the high voltage battery supplying electric-power to an electric motor for travel of an electric vehicle, an interior/exterior air switching device switching a mode between an exterior-air mode in which exterior-air is introduced from an outside of the electric vehicle and an interior-air mode in which interior-air of a vehicle cabin is circulated, a fog suppressor to which electric-power is supplied from a low voltage battery that supplies electric-power to low voltage devices that are operated at a voltage lower than that of the high voltage battery, the fog suppressor suppressing fogging of a windshield of the electric vehicle, a determination portion determining whether the electric vehicle is in an electric-power restricted state in which the electric compressor is to be restricted from consuming electric-power from the high voltage battery, and a fixed control portion controlling the electric compressor to stop, controlling the interior/exterior air switching device to be in the exterior-air mode, and controlling the fog suppressor to be in an operating state, when the determination portion determines that the electric vehicle is in the electric-power restricted state.

In this case, when it is determined that the electric vehicle is in the electric-power restricted state in which power consumption from the high voltage battery is to be restricted, the electric compressor is stopped. Accordingly, the power consumption from the high voltage battery is suppressed. The electric-power of the high voltage battery can be used for an electric motor for travel. In addition, the fixed control portion switches the mode of the interior/exterior air switching device to the exterior-air mode. Therefore, exterior-air of relatively low humidity is introduced into the cabin. Therefore, fogging of the windshield is suppressed. In addition, the fixed control portion controls the fog suppressor to be in an operating state. In this case, the fog suppressor receives electric-power from the low voltage battery, and thus the fog suppressor can suppress fogging of the windshield in a state where the power consumption from the high voltage battery is suppressed.

EMBODIMENTS FOR CARRYING OUT INVENTION

Figure 1:
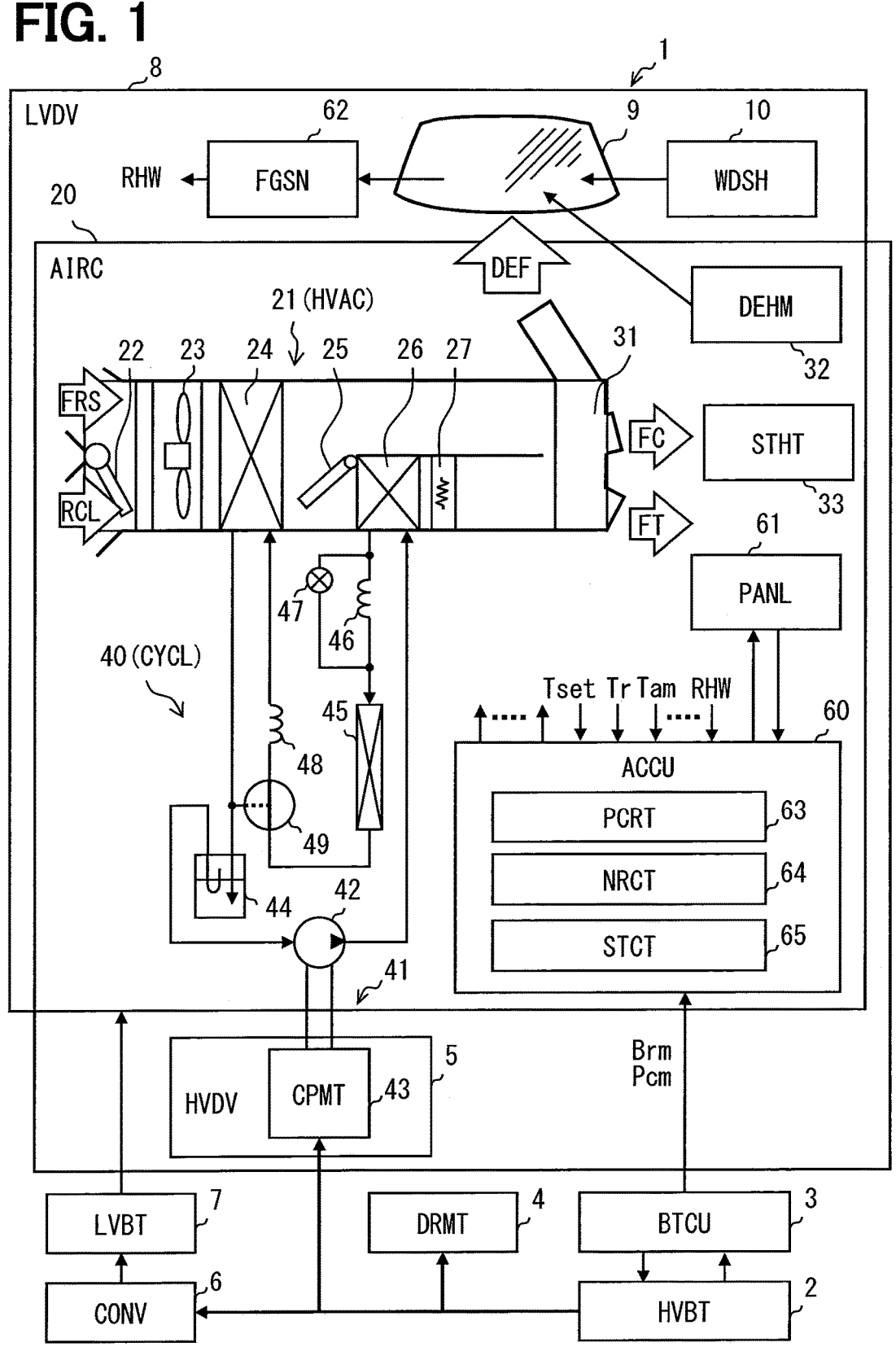
FIG. 1 is a schematic view illustrating an electric vehicle system according to a first embodiment of the present disclosure.

Hereinafter, a plurality of embodiments for embodying the disclosure disclosed below will be described with reference to the accompanying drawings. The same reference numerals are given to parts of each embodiment, which correspond to parts described in the preceding embodiment, and the description thereof will not be repeated in some cases. When only a part of the configuration is described in each embodiment, the configurations of other preceding described embodiments can be applied to the remaining parts of the configuration. Furthermore, in the subsequent embodiment, the reference numerals of which only the digits in the hundreds column are different from those of the preceding embodiment are given to parts corresponding to parts described in the preceding embodiment so as to illustrate the corresponding relationship therebetween and the description will not be repeated in some cases. The combinations of the parts are not limited to those specifically illustrated in each embodiment. Even when there is no description, the embodiments can also be used in partial combination as long as there is not a problem in combination.

(First Embodiment)

An electric vehicle system 1 illustrated in FIG. 1 is mounted on an electric vehicle. The electric vehicle is a vehicle which includes an electric driving system having both a storage battery and an electric motor. The electric vehicle may be a road traveling vehicle, a vessel, or an aircraft. A so-called electric car having only an electric driving system may serve as the electric vehicle. A hybrid vehicle which has, in addition to an electric driving system, an internal combustion engine system having both a fuel tank and an internal combustion engine may serve as the electric vehicle.

The electric vehicle system 1 has a high voltage battery (HVBT) 2. The high voltage battery 2 is a secondary battery. A lithium-ion battery or the like may serve as the high voltage battery 2. The high voltage battery 2 supplies relatively high voltage of several hundred volts. The high voltage battery 2 is charged through a stationary wide-area electric power grid or a generator mounted on a vehicle. The electric vehicle system 1 has a battery control unit (BTCU) 3. The battery control unit 3 monitors charging/discharging of the high voltage battery 2 and controls charging/discharging thereof.

The electric vehicle system 1 has an electric motor (DRMT) 4 for travel. The electric motor 4 drives a drive wheel of the electric vehicle. The high voltage battery 2 is designed to mainly supply electric-power to the electric motor 4.

The electric vehicle system 1 has a high voltage device (HVDV) 5 mounted on the electric vehicle. The high voltage device 5 does not include the electric motor 4 for travel. The high voltage device 5 is a device with a rated voltage suitable to receive electric-power from the high voltage battery 2.

The electric vehicle system 1 has a converter (CONV) 6 and a low voltage battery (LVBT) 7. The converter 6 converts the electric-power supplied from the high voltage battery 2 and supplies the converted electric-power to the low voltage battery 7. The converter 6 charges the low voltage battery 7. The converter 6 is also an example of the high voltage device 5. The low voltage battery 7 is a secondary battery of relatively low voltage. The low voltage battery 7 supplies voltage of approximately 10 volts, for example, 12 volts or 24 volts. The low voltage battery 7 is charged by the high voltage battery 2 through the converter 6.

When remaining power of the high voltage battery 2 is sufficiently large, the converter 6 charges the low voltage battery 7 such that the remaining power of the low voltage battery 7 maintains at a target level. The low voltage battery 7 is charged such that, even when the high voltage battery 2 is discharged to the extent that the high voltage battery 2 cannot drive the electric motor 4, the low voltage battery 7 supplies electric-power to a plurality of loads and can operate the loads. When the remaining power of the high voltage battery 2 is small, the converter 6 may stop charging of the low voltage battery 7. Accordingly, an excessive reduction in the remaining power of the high voltage battery 2 is suppressed. Even when the converter 6 stops charging of the low voltage battery 7, the low voltage battery 7 can continue, for a predetermined period, electric-power supply to the plurality of loads connected to the low voltage battery 7. The capacity of the low voltage battery 7 can be set to, for example, a value in which electric-power supply is continued to the loads for a low electricity-storage-amount period which is a period from a point in time at which it is determined that the remaining power of the high voltage battery 2 is small to a point in time at which the high voltage battery 2 is charged.

The electric vehicle system 1 has a plurality of low voltage devices (LVDV) 8. The plurality of low voltage devices 8 are operated by the voltage lower than the voltage from the high voltage battery 2. The plurality of low voltage devices 8 are operated by the electric-power supplied from the low voltage battery 7. The plurality of low voltage devices 8 include most devices of an air-conditioning device 20 described below. Only an electric compressor 41 of the air-conditioning device 20 is not included in the low voltage devices 8.

The electric vehicle system 1 may have a windshield 9 of a vehicle. The windshield 9 is installed in front of a driver of a vehicle. The windshield 9 is also referred to as a windscreen. The windshield 9 is a target of fogging suppression control.

The electric vehicle system 1 has a window heater (WDSH) 10 installed in the windshield 9. The window heater 10 is an electric heater unit which is installed in the windshield 9 and can directly heat the windshield 9. An electric heating wire laid in the windshield 9 or a transparent heating body adhering to the windshield 9 may serve as the window heater 10. The window heater 10 is one of the low voltage devices 8 and receives the electric-power from the low voltage battery 7.

The window heater 10 is an element which can perform a heating function on the windshield 9, even when an electric compressor 41 is stopped. The window heater 10 is the only heating element capable of directly heating the windshield 9. The window heater 10 directly suppresses fogging of the windshield 9, in such a manner that the window heater 10 directly raises a temperature of the windshield 9. The window heater 10 may be used as an example of a fog suppressor. The fog suppressor receives the electric-power from the low voltage battery 7 which supplies the electric-power to the low voltage devices 8 operated by the voltage lower than that of the high voltage battery 2. The fog suppressor suppresses fogging of the windshield 9 of the electric vehicle.

The electric vehicle system 1 has an air-conditioning device (AIRC) 20 for a vehicle. The window heater 10 can be conceived as a configuration element of the air-conditioning device 20. The air-conditioning device 20 has an air conditioning unit (HVAC) 21. The air conditioning unit 21 is also referred to as a Heating Ventilating and Air-Conditioning (HVAC) unit. The air conditioning unit 21 has a plurality of elements 22 to 27, and 31 to perform heating, ventilating, and air-conditioning of a cabin of the electric vehicle. The air conditioning unit 21 provides a duct through which air can flow to the cabin.

An interior/exterior air switching device 22 selects air introduced to the air conditioning unit 21. The interior/exterior air switching device 22 can select interior-air (RCL) or exterior-air (FRS). The interior/exterior air switching device 22 may continuously or stepwise adjust the ratio between interior-air and exterior-air. The interior/exterior air switching device 22 may be provided by an interior-air flow passage, an exterior-air flow passage, and a switching damper mechanism.

The interior-air is air circulately introduced from the cabin. The exterior-air is air newly introduced from the outside. When heating of the cabin is required, a temperature of the exterior-air is usually lower than a temperature of the interior-air. Accordingly, the humidity of the exterior-air is usually lower than the humidity of the interior-air. Furthermore, in many cases, the humidity of the exterior-air may be lower than the humidity of the interior-air caused by a user in the cabin. Therefore, the exterior-air can be used to lower the humidity of the air blown from the air conditioning unit 21 or to lower the humidity of the cabin.

The interior/exterior air switching device 22 switches a mode between an exterior-air mode in which the exterior-air is introduced from the outside and an interior-air mode in which the interior-air of the cabin circulates. When the interior/exterior air switching device 22 selects the exterior-air mode, the interior/exterior air switching device 22 lowers the humidity of the cabin. The interior/exterior air switching device 22 is one of humidity lowering devices which lowers the humidity of the cabin even when the electric compressor 41 is stopped. The interior/exterior air switching device 22 indirectly suppresses fogging of the windshield 9, in such a manner that the interior/exterior air switching device 22 lowers the humidity of the cabin. The interior/exterior air switching device 22 may be used as an example of the fog suppressor.

A blower 23 is located in the air conditioning unit 21 and generates an air flow flowing into the cabin. The blower 23 is also referred to as a blower fan.

A cooling heat exchanger 24 is a part of a refrigeration circuit 40 described below. The cooling heat exchanger 24 is an interior heat exchanger of the refrigeration circuit 40. An evaporator of the refrigeration circuit 40 is provided as the cooling heat exchanger 24. The cooling heat exchanger 24 performs cooling of air flowing through the air conditioning unit 21, using refrigerant. The refrigerant which is in a low-temperature and low-pressure state and flows in the refrigeration circuit 40 flows through the cooling heat exchanger 24. The cooling heat exchanger 24 is disposed in a state where the cooling heat exchanger 24 cools the entirety of air flowing through the air conditioning unit 21.

The cooling heat exchanger 24 can perform cooling of air only in a state where the electric compressor 41 of the high voltage device 5 is operated. Accordingly, the cooling heat exchanger 24 is an air cooling element which does not perform an air cooling function in a state where the electric compressor 41 is stopped. The cooling heat exchanger 24 performs a cooling function, only in a state where the refrigeration circuit 40 performs a cooling operation. When the cooling heat exchanger 24 performs the cooling function, dew condensation water is generated on a surface of the cooling heat exchanger 24. When the cooling heat exchanger 24 does not perform the cooling function, the dew condensation water is evaporated, and then is blown to the cabin. The cooling heat exchanger 24 is the only air cooling element in the air-conditioning device 20.

An air mix damper 25 adjusts the temperature of blown air in such a manner that the air mix damper 25 adjusts, in the air conditioning unit 21, the ratio between hot air and cold air. The air mix damper 25 adjusts the ratio between the amount of air passing through an air heating element described below and the amount of air bypassing the air heating element. The air mix damper 25 is provided as a temperature regulation member which adjusts the temperature of the blown air.

A heating heat exchanger 26 is a part of the refrigeration circuit 40 described below. The heating heat exchanger 26 is an interior heat exchanger of the refrigeration circuit 40. A condenser of the refrigeration circuit 40 may be provided as the heating heat exchanger 26. The heating heat exchanger 26 performs, using refrigerant, heating of air flowing through the air conditioning unit 21. Refrigerant in a high-temperature and high-pressure state flows through the heating heat exchanger 26. The heating heat exchanger 26 is disposed in a state where the heating heat exchanger 26 heats at least a portion of air flowing through the air conditioning unit 21. The heating heat exchanger 26 is one of air heating elements.

The heating heat exchanger 26 can perform heating of air, only in a state where the electric compressor 41 of the high voltage device 5 is operated. Accordingly, the heating heat exchanger 26 is an air heating element which does not perform a heating function on the windshield 9 in a state where the electric compressor 41 is stopped.

An electric heater 27 heats, using the electric-power, air which flows through the air conditioning unit 21 and is blown into the cabin. The electric heater 27 is disposed in a state where the electric heater 27 heats at least a portion of the air flowing through the air conditioning unit 21. The electric heater 27 is provided by an electric heater element. The electric heater is provided by a heater element which is referred to as a Positive Temperature Coefficient (PTC) heater. The electric heater 27 is one of the low voltage devices 8. The electric heater 27 receives the electric-power from the low voltage battery 7.

The electric heater 27 is one of the air heating elements, which heats air blown into the vehicle cabin and indirectly heats the windshield 9. The electric heater 27 is an air heating element which can perform the heating function on the windshield 9 even in a state where the electric compressor 41 is stopped. The electric heater 27 is one of the heating elements, which can indirectly heat the windshield 9. The electric heater 27 indirectly suppresses fogging of the windshield 9 in such a manner that the electric heater 27 raises a temperature of the windshield 9. The electric heater 27 may be used as an example of the fog suppressor.

An air-blowing mode switch device 31 switches an air-blowing mode of air from the air conditioning unit 21 to the cabin. The air-blowing mode switch device 31 provides a plurality of air-blowing modes, in such a manner that the air-blowing mode switch device 31 selectively opens/closes a plurality of outlet ports. The air-blowing mode switch device 31 can have a plurality of air flow passages and a plurality of damper devices which open/close the air flow passages. The air-blowing mode switch device 31 provides, for example, a defroster outlet port (DEF), a face outlet port (FC), and a foot outlet port (FT). The air-blowing mode switch device 31 provides a plurality of air-blowing modes by using the plurality of outlet ports in combination. In a defroster air-blowing mode, air flowing through the air conditioning unit 21 is blown from the defroster outlet port (DEF) toward mainly the windshield 9. In a face air-blowing mode, air flowing through the air conditioning unit 21 is blown from the face outlet port (FC) toward mainly the upper body of a passenger. In a foot air-blowing mode, air flowing through the air conditioning unit 21 is blown from the foot outlet port (FT) toward mainly the feet of a passenger.

The air-conditioning device 20 has a dehumidifier (DEHM) 32. The dehumidifier 32 dehumidifies air in the cabin and air flowing through the air conditioning unit 21. The dehumidifier 32 may be provided by absorption material capable of selecting absorption of water vapor or desorption of water vapor. Zeolite, for example, can be used as the absorption material. Zeolite can switch absorption of water vapor (dehumidification) and desorption of water vapor (recycling) by adjusting a temperature of the zeolite.

The dehumidifier 32 can lower the humidity of air in the cabin even in a state where the electric compressor 41 is stopped. The dehumidifier 32 is one of humidity lowering devices which lowers the humidity of the cabin. The dehumidifier 32 indirectly suppresses fogging of the windshield 9, in such a manner that the dehumidifier 32 lowers the humidity of the cabin. The dehumidifier 32 may be used as an example of the fog suppressor.

The air-conditioning device 20 has a seat heater (STHT) 33. The seat heater 33 is an electric heater which warms up a seat installed in the cabin. The seat heater 33 is one of the low voltage devices 8. The seat heater 8 warms up the seat which is in direct contact with a user, and thus the user can directly perceive an operated state or a stopped state of the seat heater 33.

The air-conditioning device 20 has the refrigeration circuit (CYCL) 40. The cooling heat exchanger 24 is provided as an interior cooling heat exchanger of the refrigeration circuit 40. The heating heat exchanger 26 is provided as an interior heating heat exchanger of the refrigeration circuit 40. The refrigeration circuit 40 has at least the cooling heat exchanger 24 to enable at least cooling of air. The refrigeration circuit 40 of the present embodiment is a heat pump circuit capable of performing both cooling of air and heating of air.

The refrigeration circuit 40 has the electric compressor 41. The electric compressor 41 has a compressor 42 and an electric motor (CPMT) 43. A rotation shaft of the compressor 42 is connected to a rotation shaft of the electric motor 43. The electric motor 43 drives the compressor 42. The electric motor 43 drives the compressor 42, and thus the compressor 42 sucks in refrigerant and compresses the sucked in refrigerant, then discharges the compressed refrigerant. The electric motor 43 is an example of the high voltage device 5. The electric motor 43 rotates in such a manner that the electric motor 43 receives the electric-power of high voltage from the high voltage battery 2. The electric motor 43 is one of electric loads that has relatively large electric power consumption among the loads mounted on the electric vehicle. In an example illustrated in drawings, the electric motor 43 has an electric load of which the electric power consumption is large secondary to the electric motor 4 for travel. Accordingly, a reduction in the remaining power of the high voltage battery 2 can be suppressed by preventing the electric-power supply to the electric motor 43. A travel distance of the electric vehicle can be extended by preventing the electric-power to the electric motor 43.

A gas-liquid separator 44 is provided on an intake side of the compressor 42. The compressor 42 sucks refrigerant from the gas-liquid separator 44. The heating heat exchanger 26 is provided on a discharge side of the compressor 42. The compressor 42 supplies the refrigerant in a high-temperature and high-pressure state to the heating heat exchanger 26. The heating heat exchanger 26 functions as a radiator or a condenser in the refrigeration circuit 40.

The refrigeration circuit 40 has an exterior heat exchanger 45. The exterior heat exchanger 45 is installed outside of the electric vehicle and can perform heat-exchange with the exterior-air. The exterior heat exchanger 45 can function as an evaporator or a radiator. The exterior heat exchanger 45 is provided between the heating heat exchanger 26 and the cooling heat exchanger 24. Refrigerant flowing through the heating heat exchanger 26 is supplied into the exterior heat exchanger 45. The refrigerant flowing through the exterior heat exchanger 45 can be supplied into the cooling heat exchanger 24.

A parallel circuit including a decompressor 46 and an opening/closing valve 47 is disposed between the heating heat exchanger 26 and the exterior heat exchanger 45. The parallel circuit provides a portion of a switch device in the refrigeration circuit 40. An expansion valve or a capillary tube may be provided as the decompressor 46. The opening/closing valve 47 is a solenoid valve having an electromagnetic actuator. Refrigerant flowing through the heating heat exchanger 26 passes through the decompressor 46 or the opening/closing valve 47, and then flows into the exterior heat exchanger 45. When the opening/closing valve 47 is opened, the refrigerant flows through the opening/closing valve 47. Accordingly, the refrigerant flowing through the heating heat exchanger 26 maintains a high-temperature and a high-pressure and flows into the exterior heat exchanger 45. When the opening/closing valve 47 is opened, the exterior heat exchanger 45 functions as a radiator.

A series circuit including a decompressor 48 and a switching valve 49 is disposed between the exterior heat exchanger 45 and the cooling heat exchanger 24. The series circuit is provided as a portion of the switch device in the refrigeration circuit 40. An expansion valve or a capillary tube may be provided as the decompressor 48. The switching valve 49 may be a solenoid valve having an electromagnetic actuator. The switching valve 49 may be a three-port switching valve. The switching valve 49 has a common port communicating with the exterior heat exchanger 45, a first port communicating with the decompressor 48, and a second port communicating with the gas-liquid separator 44. The second port is provided as a bypass flow passage through which the refrigerant flowing through the exterior heat exchanger 45 can flow to the gas-liquid separator 44, without passing through the decompressor 48 and the cooling heat exchanger 24. The switching valve 49 can selectively provide a state in which the common port communicates with the first port or a state in which the common port communicates with the second port. When the switching valve 49 causes the common port to communicate with the first port, refrigerant flows through the decompressor 48 and the cooling heat exchanger 24. Accordingly, the refrigerant flowing through the exterior heat exchanger 45 is decompressed by the decompressor 48, and then flows through the cooling heat exchanger 24. In this case, the refrigerant in the low-temperature and low-pressure state performs cooling of the air in the air conditioning unit 21, in such a manner that the refrigerant is evaporated in the cooling heat exchanger 24. Thus, when the switching valve 49 causes refrigerant to flow to the decompressor 48, the cooling heat exchanger 24 functions as an evaporator. When the switching valve 49 causes the common port to communicate with the second port, refrigerant flows while bypassing the cooling heat exchanger 24. Accordingly, the refrigerant flowing through the exterior heat exchanger 45 passes through the gas-liquid separator 44 and is sucked into the compressor 42. In this case, only the heating heat exchanger 26 functions.

The opening/closing valve 47 and the switching valve 49 are controlled in association with each other. When the opening/closing valve 47 is opened, the switching valve 49 causes refrigerant to flow to both the decompressor 48 and the cooling heat exchanger 24. In this case, the cooling heat exchanger 24 functions as an evaporator, and thus performs cooling of air flowing through the air conditioning unit 21. Furthermore, the heating heat exchanger 26 functions as a radiator, and thus performs heating of air flowing through the air conditioning unit 21. When the opening/closing valve 47 is closed, the switching valve 49 causes refrigerant of the air conditioning unit to bypasses both the decompressor 48 and the cooling heat exchanger 24. In this case, the cooling heat exchanger 24 is disabled and the heating heat exchanger 26 functions as a radiator, and thus the air flowing through the air conditioning unit 21 is heated.

The air-conditioning device 20 has an air conditioning control unit (ACCU) 60. The air conditioning control unit 60 constitutes a control system for controlling the air-conditioning device 20. The air conditioning control unit 60 receives signals from a plurality of input devices including a plurality of sensors and controls a plurality of actuators, in accordance with the signals and control programs set in advance.

The air conditioning control unit 60 controls, for example, a plurality of actuators related to a temperature control of the cabin. The air conditioning control unit 60 may control the air mix damper 25 and the blower 23 such that a room temperature Tr, that is, a temperature of the cabin, becomes a target temperature Tset. Furthermore, the air conditioning control unit 60 may operate the electric compressor 41 within a range of an amount of available electric-power Pcm which is allowed by the battery control unit 3. The air conditioning control unit 60 may control both the cooling heat exchanger 24 and the heating heat exchanger 26 to be a predetermined temperature state by adjusting a plurality of valves 47, 49. Furthermore, the air conditioning control unit 60 controls a plurality of actuators which can directly or indirectly serve fogging suppression of the windshield 9.

The air-conditioning device 20 has an operation panel (PANL) 61. The operation panel 61 has a plurality of switches for operating the air-conditioning device 20 and a display device which shows an operating state of the air-conditioning device 20. Thus, the operation panel 61 is one of the input devices and, also, is one of output devices of the control system. The plurality of switches may include a setting unit for setting the target temperature, an interior/exterior air switch for selecting the interior-air or the exterior-air, an air volume switch for setting an air volume, an air conditioner switch for selecting cooling or heating, and an air-blowing mode switch for selecting the air-blowing mode. The air-blowing mode switch may include a DEF switch for selecting a defroster air-blowing mode through the defroster outlet port (DEF).

The air-conditioning device 20 has a plurality of sensors. The plurality of sensors include a dew condensation sensor (FGSN) 62 for detecting a relative humidity RHW of an inner-side surface of the windshield 9. The dew condensation sensor 62 may be used as an example of a sensor for detecting fogging of the windshield 9. An output signal from the dew condensation sensor 62 indicates the relative humidity RHW at a temperature of the inner-side surface of the windshield 9. Thus, when the relative humidity RHW output from the dew condensation sensor 62 is greater than 100%, it can be said that fogging may occur on the windshield 9. On the contrary, when the relative humidity RHW output from the dew condensation sensor 62 is less than 100%, it can be determined that there is no possibility that fogging may occur on the windshield 9. In addition, when the relative humidity RHW output from the dew condensation sensor 62 is significantly greater than 100%, it can be determined that there is a high possibility that fogging may occur on the windshield 9.

The air conditioning control unit 60 receives signals from, for example, a room temperature sensor for detecting the room temperature Tr, a setting unit for setting the target temperature Tset, and an exterior-air temperature sensor for detecting an exterior-air temperature Tam. The air conditioning control unit 60 can receive signals from an insolation sensor for detecting the amount of insolation and a sensor for detecting the temperature of a surface of a heat exchange fin of the cooling heat exchanger 24. The air conditioning control unit 60 can receive a signal which indicates a current operating state of the refrigeration circuit 40, that is, a signal representing that the current operating state is in a cooling-operation state or a heating-operation state. The air conditioning control unit 60 can receive signals from a plurality of sensors which detect a pressure of refrigerant in each portion of the refrigeration circuit 40 and/or detect a temperature of the refrigerant. The air conditioning control unit 60 can receive signals from, for example, sensors for detecting both a pressure of a high-pressure refrigerant of the refrigeration circuit 40 and a pressure of a low-pressure refrigerant.

Furthermore, the air conditioning control unit 60 can obtain, from the inside or the outside thereof, a signal indicating an amount of current electric-power consumption (VA) of the electric compressor 41. In addition, the air conditioning control unit 60 can obtain, from the inside or the outside thereof, a signal indicating a current output instruction value (IVOout) of the electric compressor 41. The air conditioning control unit 60 can obtain, from the battery control unit 3, the amount of available electric-power Pcm which is the upper limit of the amount of electric power available in the electric compressor 41. The air conditioning control unit 60 can obtain, from the battery control unit 3, a remaining power Brm of the electric-power charged in the high voltage battery 2.

The air conditioning control unit 60 has an electric-power restriction determination portion (PCRT) 63 which determines whether the electric vehicle is in an electric-power restricted state in which the air-conditioning device 20 is to be prevented from using the electric-power of the high voltage battery 2. It can be said that the electric-power restricted state means that the electric-power should be prevented from being discharged from the high voltage battery 2.

The air conditioning control unit 60 has a normal state control portion (NRCT) 64. When it is determined that the electric vehicle is not in the electric-power restricted state, the normal state control portion (NRCT) 64 performs variable control on the plurality of low voltage devices 8 including the interior/exterior air switching device 22 and the fog suppressors (10, 27, and 32). The normal state control portion 64 may be also referred to as a feedback control portion which performs, based on a signal from the dew condensation sensor 62, feedback-control on configuration elements of the air-conditioning device 20 such that fogging of the windshield 9 is suppressed. The normal state control portion 64 performs, based on the signal from the dew condensation sensor 62, feedback-control on the low voltage device 8 such that fogging of the windshield 9 is suppressed. Specifically, the normal state control portion 64 performs, based on the signal from the dew condensation sensor 62, feedback-control on at least the fog suppressor (10) such that fogging of the windshield 9 is suppressed.

Furthermore, the air conditioning control unit 60 has a fixed control portion (STCT) 65. When the electric vehicle is in the electric-power restricted state, the fixed control portion (STCT) 65 controls only a portion of the configuration elements of the air-conditioning device 20 to maintain the operating state such that fogging of the windshield 9 is suppressed. When it is determined that the electric vehicle is in the electric-power restricted state, the fixed control portion 65 controls, substituting feedback-control of the normal state control portion 64, the interior/exterior air switching device to maintain the exterior-air mode and, further, controls the fog suppressor to maintain an operated state. When it is determined that the electric vehicle is in the electric-power restricted state, the low voltage devices 8, excluding both the interior/exterior air switching device 22 subjected to fixed control and the fog suppressor 10 subjected to fixed control, are subjected to variable-control by the normal state control portion 64. In other words, even when the electric compressor 41 is stopped due to the electric-power restricted state, the low voltage devices 8 can be operated.

The fixed control portion 65 executes the fixed control described above in accordance with the determination result from the electric-power restriction determination portion 63. The control provided by the fixed control portion 65 is fixed control independent to the signal from the dew condensation sensor 62. The control provided by the fixed control portion 65 is control which suppresses fogging of the windshield 9, using only the electric-power of the low voltage battery 7 and without using the electric-power of the high voltage battery 2.

The control provided by the fixed control portion 65 is control in which only the above-described part of the configuration elements is fixedly controlled to be set to the operated state and the remaining configuration elements are in the same controlled state as the state controlled by the normal state control portion 64. The control executed by the fixed control portion 65 is provided by using, in combination, both control under which the interior/exterior air switching device 22 is fixed to the exterior-air mode and control under which the configuration elements that directly and/or indirectly heat the windshield 9 heats the windshield 9.

Microcomputers having storage media readable by a computer are provided as the battery control unit 3 and the air conditioning control unit 60. The storage medium non-temporarily stores programs readable by a computer. A semiconductor memory or a magnetic disc may be provided as the storage medium. The program is executed by the control unit and causes the control unit to function as the device described in this specification. In addition, the program causes the control unit to function such that the control unit executes a control method described in this specification. Means provided by the control unit can also be referred to as a functional block or a functional module for achieving a predetermined function.

The battery control unit 3 outputs a signal which indicates the remaining power Brm of an amount of the electric-power charged in the high voltage battery 2. Furthermore, the battery control unit 3 outputs a signal which indicates an amount of available electric-power allowed to a plurality of equipment that receive the electric-power from the high voltage battery 2. The battery control unit 3, for example, outputs a signal which indicates the amount of available electric-power Pcm by which the electric compressor 41 of the air-conditioning device 20 can use the electric-power.

Figure 2:
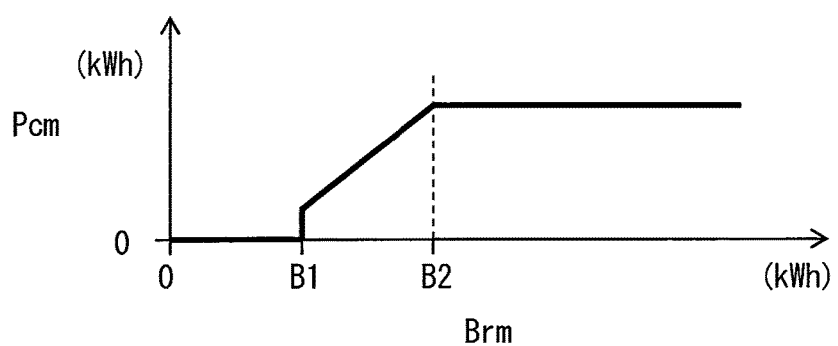
FIG. 2 is a view illustrating an amount of available electric-power of the first embodiment.

FIG. 2 is a graph illustrating setting characteristics of the amount of available electric-power Pcm in the battery control unit 3. When the remaining power Brm is less than a predetermined value B1, an amount of available electric-power Pcm is set to 0 (zero). In other words, when the high voltage battery 2 should be prevented from discharging the electric-power, for example, the remaining power Brm being less than the predetermined value B1, the battery control unit 3 prevents the electric compressor 41 from operating. When the remaining power Brm is greater than the predetermined value B1 and the remaining power Brm is less than a predetermined value B2, an amount of available electric-power Pcm is set proportionally to the remaining power Brm. Furthermore, when the remaining power Brm is greater than the predetermined value B1, an amount of available electric-power Pcm may be set to a value lower than a characteristic line illustrated in the drawing such that the operation of the electric compressor 41 is suppressed. When the remaining power Brm is greater than the predetermined value B1, the battery control unit 3 allows the electric compressor 41 to operate.

Figure 3:
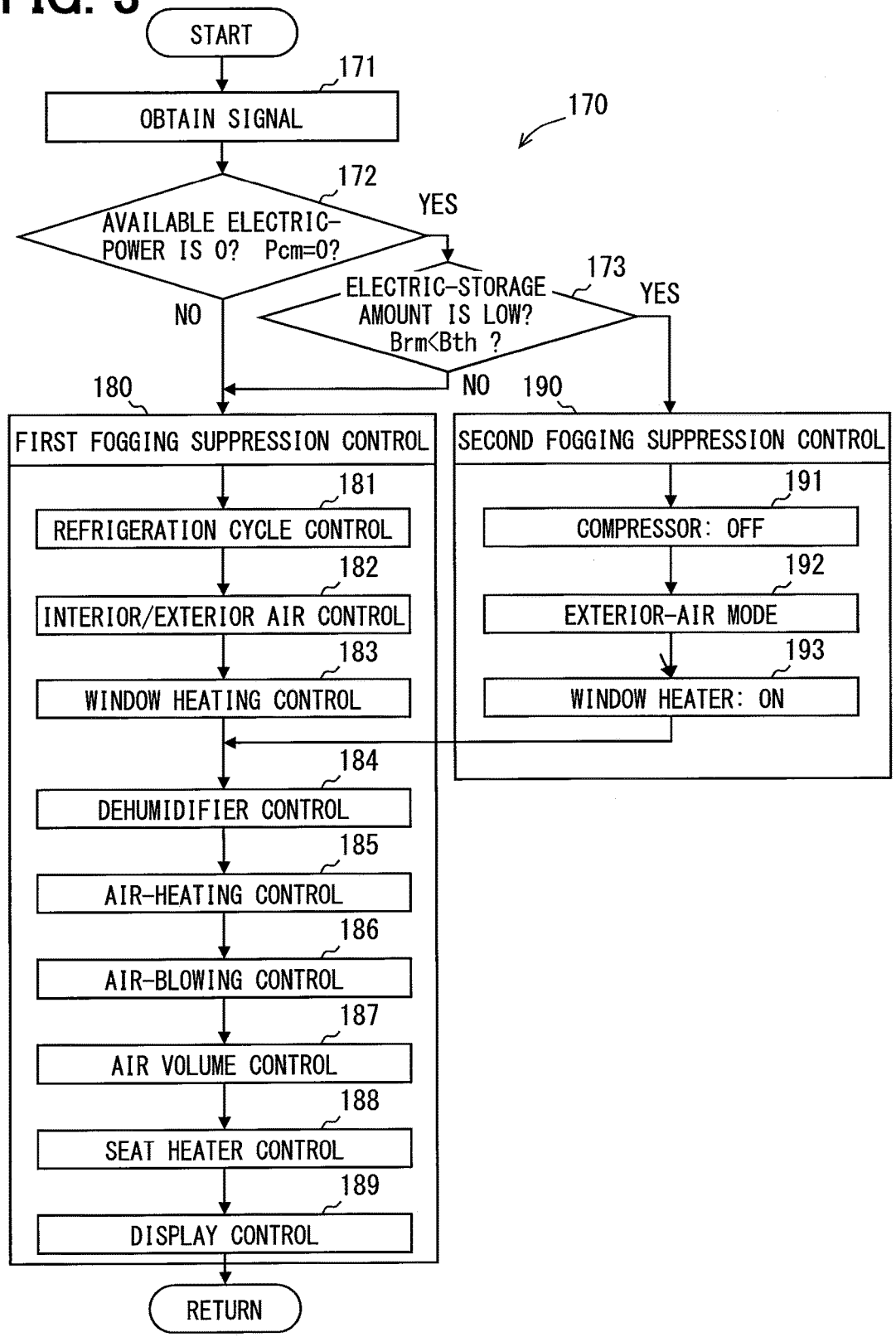
FIG. 3 is a flowchart illustrating an air conditioning control of the first embodiment.

FIG. 3 illustrates a fogging suppression process 170 for suppressing fogging of the windshield 9. The air conditioning control unit 60 repeatedly executes the fogging suppression process 170 with a predetermined period.

The air conditioning control unit 60 obtains, in Step 171, information necessary for the fogging suppression process 170. The air conditioning control unit 60 obtains, for example, the remaining power Brm, an amount of available electric-power Pcm, and the relative humidity RHW.

In Step 172, it is determined whether the electric compressor 41 is available or not. The control operation in Step 172 provides a first determination portion which determines whether use of the electric compressor 41 is prevented by the battery control unit 3 controlling the high voltage battery 2.

When an amount of available electric-power Pcm is greater than 0 (zero), it is determined that the electric compressor 41 is available. In this case, the battery control unit 3 allows the use of the electric compressor 41. When an amount of available electric-power Pcm is greater than 0 (zero), the process proceeds to Step 180. In this case, the air-conditioning device 20 can suppress fogging of the windshield 9, using both the electric-power of the high voltage battery 2 and the electric-power of the low voltage battery 7.

When an amount of available electric-power Pcm is 0 (zero), it is determined that the electric compressor 41 is unavailable. In this case, the battery control unit 3 prevents the use of the electric compressor 41. When an amount of available electric-power Pcm is 0 (zero), the process proceeds to Step 173.

The air conditioning control unit 60 determines, in Step 173, whether the high voltage battery 2 is in a low electric-storage amount state or not. The control operation in Step 173 provides a second determination portion which determines whether the remaining power Brm of the high voltage battery 2 is less than a predetermined threshold Bth.

When the remaining power Brm is less than the predetermined threshold Bth, it can be determined that the high voltage battery 2 is in the low electric-storage amount state. When the high voltage battery 2 is not in the low electric-storage amount state, the process proceeds to Step 180. When the high voltage battery 2 is in the low electric-storage amount state, the process proceeds to Step 190. In this case, the battery control unit 3 prevents the use of the electric compressor 41 and the remaining power Brm of the high voltage battery 2 is less than the threshold Bth. In other words, it can be conceived that the high voltage battery 2 should be prevented from discharging the electric-power. The air-conditioning device 20 suppresses, in Step 190, fogging of the windshield 9, using only the electric-power of the low voltage battery 7 and without using the electric-power of the high voltage battery 2.

The control portion which performs the control operation in Step 172 and the control operation in Step 173 may also be used as the electric-power restriction determination portion 63 which determines whether the electric vehicle is in the electric-power restricted state in which the power consumption of the high voltage battery 2 by the electric compressor 41 should be restricted. When the use of the electric compressor 41 is prevented by the battery control unit 3 (Pcm=0) and the remaining power Brm is less than the threshold Bth (Brm<Bth), the electric-power restriction determination portion 63 determines that the electric vehicle is in the electric-power restricted state. It can be said that both Step 172 and Step 173 provide the determination portion which determines whether the high voltage battery 2 is in the low electric-storage amount state or not.

The air conditioning control unit 60 executes, in Step 180, first fogging suppression control. In this case, the air-conditioning device 20 is subject to the feedback control using the signal from the dew condensation sensor 62 such that fogging of the windshield 9 is suppressed. The air-conditioning device 20 suppresses fogging of the windshield 9, using both the electric-power of the high voltage battery 2 and the electric-power of the low voltage battery 7. The control portion performing the control process of Step 180 is used as the normal state control portion 64.

The air conditioning control unit 60 controls, in Step 181, the refrigeration circuit 40 including the electric compressor 41. In this case, a rotation speed of the electric compressor 41 is controlled based on signals of, for example, the amount of available electric-power Pcm, the relative humidity RHW detected by the dew condensation sensor 62, and the temperature of the surface of the cooling heat exchanger 24. The electric compressor 41 is controlled to suppress fogging of the windshield 9 which is indicated by the signal from the dew condensation sensor 62. When fogging occurs in the windshield 9, in some cases, the electric compressor 41 is operated to supply the air, which is dehumidified by the cooling heat exchanger 24, to the cabin. In addition, when it is determined that the cooling operation is not necessary, in some cases, the electric compressor 41 is stopped.

The opening/closing valve 47 and the switching valve 49 are also controlled in Step 181. When a user requests switching of the cooling operation to the heating operation, for example, the state of the opening/closing valve 47 and the state of the switching valve 49 are reversed. Even when a user requests switching of the heating operation to the cooling operation, the state of the opening/closing valve 47 and the state of the switching valve 49 are reversed. Furthermore, in some cases, the opening/closing valve 47 and the switching valve 49 are automatically controlled to obtain an air-blowing temperature necessary to control the room temperature Tr to reach the target temperature Tset.

The air conditioning control unit 60 controls, in Step 182, the interior/exterior air switching device 22. In this case, the interior-air or the exterior-air is selected in accordance with the request from a user. Furthermore, when an automatic control is requested, the interior/exterior air switching device 22 is controlled to suppress fogging of the windshield 9, which is indicated by the signal from the dew condensation sensor 62.

The air conditioning control unit 60 executes, in Step 183, a window heating control for heating the windshield 9. In this case, the window heater 10 which can directly heat the windshield 9 is controlled. The window heater 10 is subject to, for example, feedback control such that fogging of the windshield 9 indicated by the signal from the dew condensation sensor 62 is suppressed. When fogging occurs in the windshield 9, in some cases, the electric-power is supplied to the window heater 10, and thus the windshield 9 is heated. When the windshield 9 is heated, the relative humidity of the surface of the windshield 9 is lowered. As a result, fogging of the windshield 9 is suppressed. The window heater 10 is heating means for raising the temperature of the inner-side surface of the windshield 9 to a temperature higher than a dew-point temperature of the air of the cabin. When it is determined, based on the signal from the dew condensation sensor 62, that the windshield 9 is not fogged, the power supply to the window heater 10 is cut off.

The air conditioning control unit 60 controls, in Step 184, the dehumidifier 32. In this case, the dehumidifier 32 is controlled to adjust the humidity of the cabin to a value in which a user feels comfortable. Furthermore, in some cases, the dehumidifier 32 is additionally controlled to suppress fogging of the windshield 9.

The air conditioning control unit 60 executes, in Step 185, control for heating the air flowing through the air conditioning unit 21. In this case, an element which is included in the air conditioning unit 21 and is used for heating the air is controlled to adjust the room temperature Tr to the target temperature Tset. In this case, the air mix damper 25 is controlled. Furthermore, the heating heat exchanger 26, that is, the refrigeration circuit 40, is controlled. In addition, the electric heater 27 is controlled. At Step 185, the room temperature Tr is controlled to reach the target temperature Tset, and thus a comfortable temperature condition is provided.

The air conditioning control unit 60 controls, in Step 186, the air-blowing mode switch device 31. In this case, the air-blowing mode is selected to provide a comfortable condition to a user. The air conditioning control unit 60 controls the air-blowing mode switch device 31 to achieve the air-blowing mode requested from a user. Furthermore, when an automatic control is requested, the air conditioning control unit 60 automatically selects an appropriate air-blowing mode in accordance with a temperature of the blown air and can control the air-blowing mode switch device 31 to achieve the selected air-blowing mode.

The air conditioning control unit 60 controls, in Step 187, the blower 23. The air conditioning control unit 60 controls the blower 23 to achieve an air volume requested from a user. In addition, when an automatic control is requested, the air conditioning control unit 60 may automatically control the blower 23 to achieve the air volume necessary for controlling the room temperature Tr to the target temperature Tset.

The air conditioning control unit 60 controls, in Step 188, the seat heater 33. The air conditioning control unit 60 controls the seat heater 33 in accordance with the request from a user. In addition, when it is necessary to perform a quick heating operation, for example, in the winter season, the air conditioning control unit 60 automatically operates the seat heater 33.

The air conditioning control unit 60 controls, in Step 189, a display device of the air-conditioning device 20. The air conditioning control unit 60 controls the operation panel 61 to display an air conditioning state, such as the current room temperature Tr, the target temperature Tset, the air volume, and the air-blowing mode.

The air conditioning control unit 60 executes, in Step 190, a second fogging suppression control for the case in the electric-power restricted state. In this case, the air-conditioning device 20 is fixed to a predetermined operating state such that fogging of the windshield 9 is suppressed without using the signal from the dew condensation sensor 62. When it is determined, in Step 172 and Step 173, that the electric vehicle is in the electric-power restricted state, Step 190 is always executed immediately after the determination. The process of the Step 190 continues until the electric-power restricted state is terminated.

The air-conditioning device 20 suppresses, in Step 190, fogging of the windshield 9, using only the electric-power of the low voltage battery 7 and without using the electric-power of the high voltage battery 2. The control portion performing the control process of Step 190 is used as the fixed control portion 65.

The air conditioning control unit 60 controls, in Step 191, the electric compressor 41 to be fixed to a turned-off state. In this case, the electric compressor 41 is completely stopped. The electric compressor 41 is fixed to a stopped state, without depending on the signal from the dew condensation sensor 62. The electric compressor 41 is continuously held in the stopped state, and thus discharge from the high voltage battery 2 is suppressed. As a result, the electric-power of the high voltage battery 2 can be used for the electric motor 4 for travel.

The air conditioning control unit 60 controls, in Step 192, the interior/exterior air switching device 22 to be fixed to the exterior-air mode. Accordingly, the air conditioning unit 21 causes exterior-air of relatively low humidity to be introduced. As a result, the air conditioning unit 21 suppresses fogging of the windshield 9 by supplying air of relatively low humidity into the air conditioning unit 21.

The air conditioning control unit 60 controls, in Step 193, the window heater 10 to be fixed to a turned-on state. The window heater 10 is fixed to the operating state, without depending on the signal from the dew condensation sensor 62. Accordingly, the windshield 9 is continuously heated. As a result, fogging of the windshield 9 is suppressed.

Step 193 is performed, and the process proceeds to Step 184. As a result, the low voltage devices 8, excluding both the interior/exterior air switching device 22 subject to fixed control and the window heater 10 subject to fixed control, are subject to variable control by the normal state control portion 64. The dehumidifier 32 and the seat heater 33, for example, are in a state in which both members can be operated in accordance with a request from a user. In other words, even in the electric-power restricted state, the dehumidifier 32 and the seat heater 33 are in an operable state. Furthermore, the low voltage devices 8, such as the blower 23 and the air-blowing mode switch device 31, which are included in the air-conditioning device 20 are also in the operable state.

When Step 190 is performed, and Steps 184 to 189 are executed, the control suitable for the state in which the electric compressor 41 is stopped is executed. The air mix damper 25 and the electric heater 27, for example, are controlled in Step 185 on the assumption that the air is not cooled in the cooling heat exchanger 24 and the air is not heated in the heating heat exchanger 26. The air-blowing mode switch device 31, for example, is controlled in Step 186 on the assumption that the cooling effect cannot be obtained by the cooling heat exchanger 24.

According to the present embodiment, it is determined whether the electric vehicle is in the electric-power restricted state in which the air-conditioning device 20 should be prevented from using the electric-power of the high voltage battery 2. When the electric vehicle is in the electric-power restricted state, the electric compressor 41 fixedly maintains the stopped state (the turned-off state). Accordingly, the remaining power of the high voltage battery 2 can be used for the electric motor 4 for travel.

According to the present embodiment, fogging of the windshield 9 is suppressed even in a period in which the electric compressor 41 is stopped due to electric-power restriction. In addition, suppression of fogging of the windshield 9 is executed using only the electric-power of the low voltage battery 7. Accordingly, power consumption from the high voltage battery 2 is suppressed. Furthermore, the mode is fixed to the exterior-air mode, and thus fogging is suppressed. Furthermore, in addition to the exterior-air mode, other controls for preventing fogging are additionally executed. As a result, fogging of the windshield 9 is effectively suppressed.

In one aspect of the present embodiment, only the heating element, that is, the window heater 10 for directly heating the windshield 9 is used in addition to the exterior-air mode. In other words, the windshield 9 is directly heated, in addition to the supply of air of low humidity in the exterior-air mode. Accordingly, a temperature of the windshield 9 easily becomes higher than the dew point temperature of air in the cabin. Therefore, fogging of the windshield 9 is effectively suppressed.

Furthermore, suppression of fogging by both the exterior-air mode and the operation of the window heater 10 continues over the electric-power restricted state without being affected by the signal from the dew condensation sensor 62. Since the fogging suppression control is executed during a period of the electric-power restriction, fogging is reliably suppressed. In addition, since the fogging suppression control is executed without depending on the dew condensation sensor 62, fogging can be suppressed without taking disadvantages, such as response delay of the dew condensation sensor 62 and a restriction on a detection range, associated with feedback control.

Furthermore, according to the present embodiment, when the electric compressor 41 is stopped due to electric-power restriction, devices of the air-conditioning device 20, excluding the interior/exterior air switching device 22 and the window heater 10, continue normal operation. In other words, even when Step 190 is performed, Steps 184 to 189 are executed. Accordingly, even when the electric compressor 41 is stopped due to electric-power restriction, normal air-conditioning can be performed for a user of the electric vehicle. As a result, even when the use of the electric-power of the high voltage battery 2 is restricted, the system of the present embodiment does not give an excessive feeling of discomfort or unease to a user.

(Second Embodiment)

Figure 4:
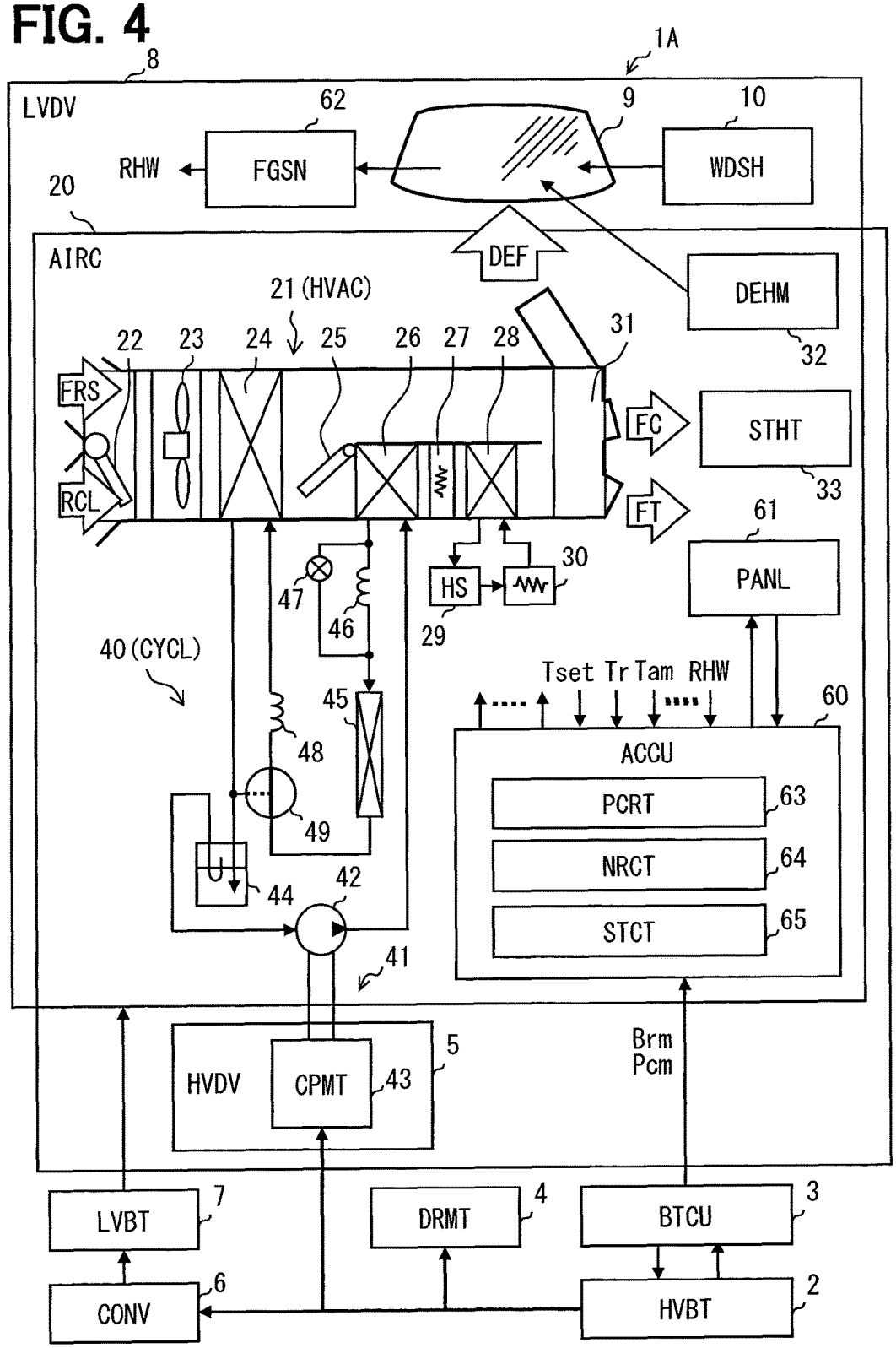
FIG. 4 is a schematic view illustrating an electric vehicle system according to a second embodiment of the present disclosure.

FIG. 4 illustrates an electric vehicle system 1A according to the second embodiment. In the present embodiment, a heat exchanger using a heating medium is provided as an example of an air heating device and a fog suppressor.

The heating medium heat exchanger 28 heats air, which flows through the air conditioning unit 21 and is blown to the cabin, using a cooling medium for cooling a device (HS) 29, as a heat source, mounted on a vehicle. The heating medium heat exchanger 28 is disposed in a state where the heating medium heat exchanger 28 heats at least a portion of air flowing through the air conditioning unit 21. The heating medium heat exchanger 28 is a portion of a cooling system for cooling the device 29. The cooling medium is a heat transfer fluid, such as water. The device 29 is a device generating heat and is provided by, for example, an electric device, an inverter circuit, or an internal combustion engine mounted on the vehicle.

When the medium circulates, a heating medium heat exchanger 28 can heat the air using heat supplied from the device 29. Accordingly, the heating medium heat exchanger 28 may be used, by itself, as an example of an air heating device. The heating medium heat exchanger 28 is an air heating element which can perform a heating function on the windshield 9 even when the electric compressor 41 is stopped. The heating medium heat exchanger 28 is one of the heating elements which can indirectly heat the windshield 9. The heating medium heat exchanger 28 indirectly suppresses fogging of the windshield 9 by increasing a temperature of the windshield 9. The heating medium heat exchanger 28 may be used as an example of the fog suppressor.

The cooling system including the heating medium heat exchanger 28 has a medium heater 30 for electrically heating the cooling medium. The medium heater 30 heats air flowing through the air conditioning unit 21 using the electric-power through the heating medium heat exchanger 28. The medium heater 30 is disposed in a state where the medium heater 30 indirectly heats at least a portion of the air flowing through the air conditioning unit 21. An electric heater element is provided as the medium heater 30. A heater element, referred to as a PTC (Positive Temperature Coefficient) heater, is provided as the medium heater 30. The medium heater 30 is an example of the high voltage device 5. The medium heater 30 receives electric-power from the high voltage battery 2.

Figure 5:
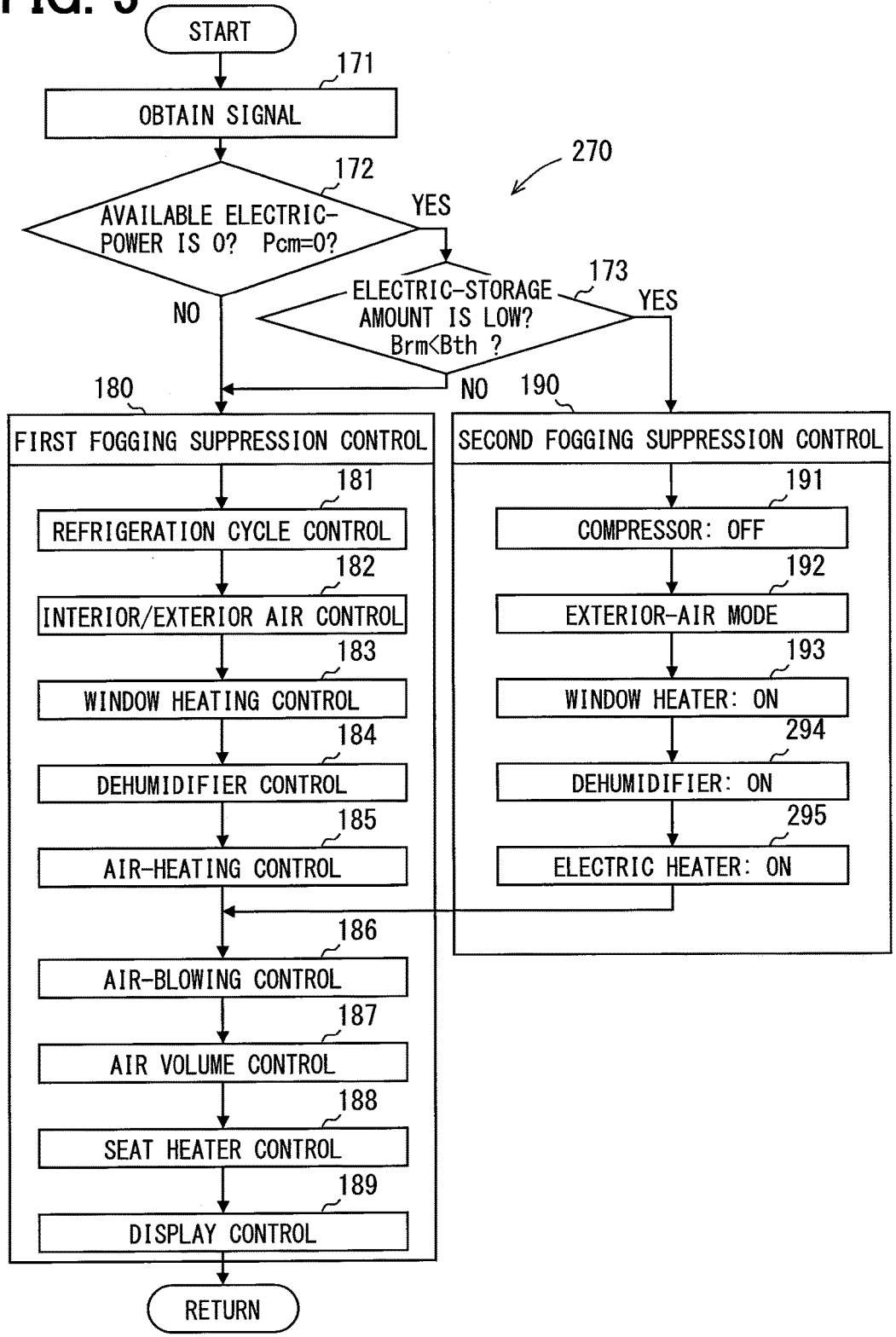
FIG. 5 is a flowchart illustrating an air conditioning control of the second embodiment.

FIG. 5 illustrates a fogging suppression process 270 according to the second embodiment. In Step 185 of the present embodiment, a flow rate of the medium flowing through the heating medium heat exchanger 28 is controlled in addition to the operations in the above-described embodiment and, further, the medium heater 30 is controlled. In the present embodiment, Steps 294, 295 are added, following Step 193 in the above-described embodiment.

The air conditioning control unit 60 controls, in Step 294, the dehumidifier 32 to be fixed to the turned-on state. The dehumidifier 32 is fixed to the operating state, without depending on a signal from the dew condensation sensor 62. Accordingly, the cabin is dehumidified, and thus fogging of the windshield 9 is suppressed.

The air conditioning control unit 60 controls, in Step 295, the air mix damper 25 such that the room temperature Tr is subject to feedback-control to reach the target temperature Tset.

The air conditioning control unit 60 controls, in Step 295, the electric heater 27 to be fixed to the turned-on state. The electric heater 27 is fixed to the operating state without depending on a signal from the dew condensation sensor 62. Accordingly, the windshield 9 is indirectly heated, and thus fogging of the windshield 9 is suppressed.

Step 295 is performed, then the process proceeds to Step 186. As a result, the fog suppressors which are fixedly controlled to be in the operating state, that is, the low voltage devices 8 excluding the interior/exterior air switching device 22, the window heater 10, the dehumidifier 32, and the electric heater 27, are subject to variable control by the normal state control portion 64. When Step 190 is performed, and the Steps 186 to 189 are executed, the variable controls suitable for the state in which the electric compressor 41 is stopped are executed in Steps 186 to 189.

Even in the present embodiment, the same operational effects as those in the embodiment described above can be obtained. Furthermore, in one aspect of the present embodiment, the dehumidifier 32 for dehumidifying the cabin is used for suppressing fogging, in addition to supplying air of low humidity in the exterior-air mode. In other words, a measure for reducing the humidity of the air in the cabin is executed. As a result, the dew point temperature of the air in the cabin is lowered, and thus fogging of the windshield 9 is effectively suppressed.

In one aspect of the present embodiment, a heating element, that is, the electric heater 27, for indirectly heating the windshield 9 is used. In other words, the windshield 9 is heated. Accordingly, a temperature of the windshield 9 easily becomes higher than the dew point temperature of air in the cabin. Therefore, fogging of the windshield 9 is effectively suppressed.

(Third Embodiment)

Figure 6:
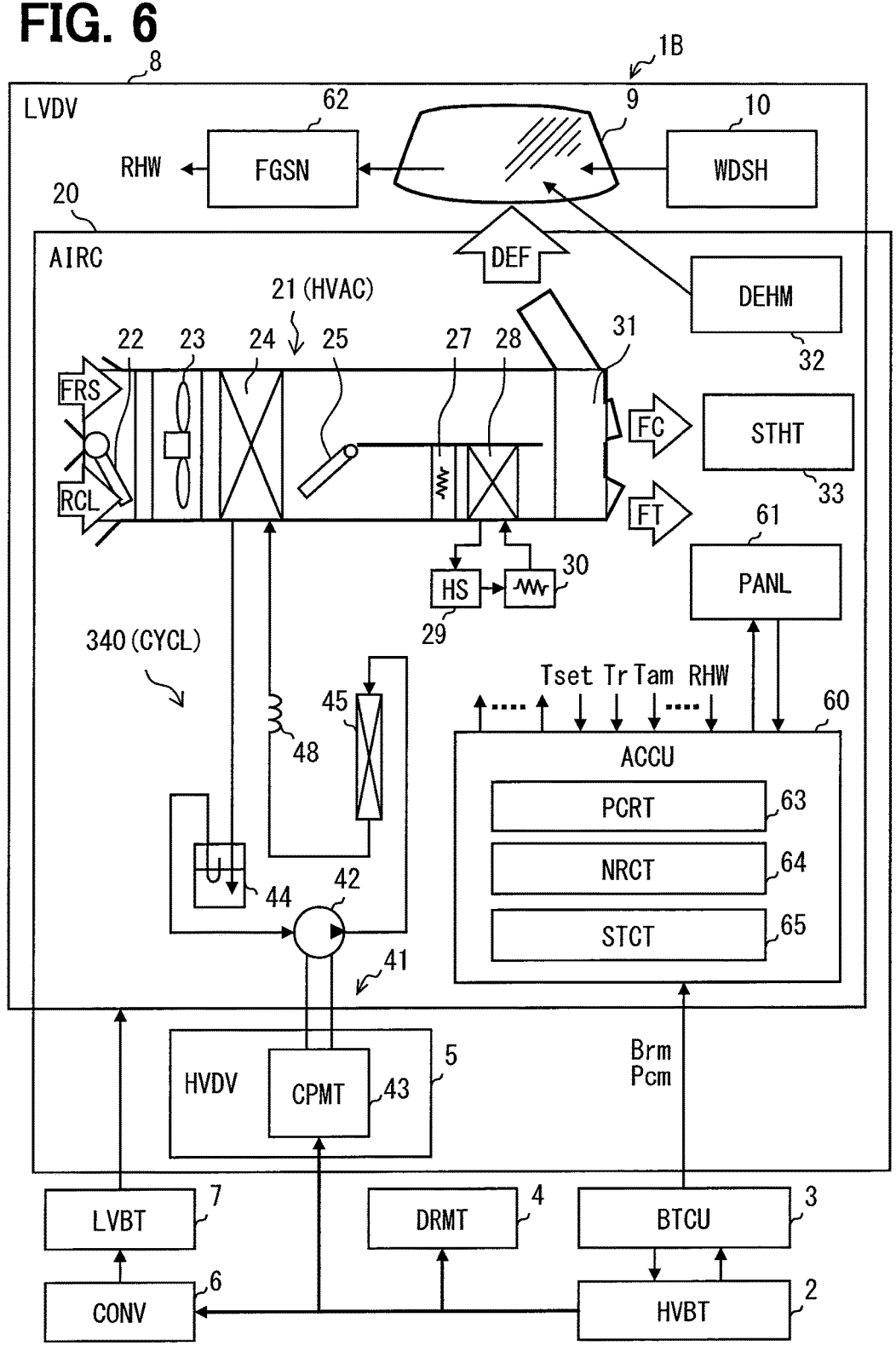
FIG. 6 is a schematic view illustrating an electric vehicle system according to a third embodiment of the disclosure.

FIG. 6 illustrates an electric vehicle system 1B according to a third embodiment. In the present embodiment, a refrigeration circuit 340 is a cooler circuit in which only cooling can be performed. Even in the present embodiment, the same operational effects as those in the embodiment described above can be obtained.

(Other Embodiments)

Hereinbefore, preferred embodiments of the disclosure disclosed above are described. However, the disclosure is not limited to the embodiments described above and can be realized in various modifications. The configurations of the embodiments described above are only exemplifications and are not intended to limit the technical scope of the disclosure.

Means and functions provided by the control unit can be provided by, for example, only software, only hardware, or a combination thereof. The control unit may be constituted by, for example, an analog circuit.

In the embodiments described above, a heat pump circuit is provided by the refrigeration circuit 40 having two interior heat exchangers 24, 26. However, instead of the heat pump circuit described above, a heat pump circuit which has a single interior heat exchanger and can switch the function of the single interior heat exchanger between cooling and heating may be applied. An inverting type heat pump circuit which can switch an operation mode between an operation mode in which the interior heat exchanger is used as an evaporator and an operation mode in which the interior heat exchanger is used as a radiator, for example, can be applied.

In the embodiments described above, in addition to fixed control relative to the exterior-air mode, an additional fogging suppression element is fixedly controlled to be in the operating state. Specifically, in the first embodiment, only the window heater 10 is fixedly controlled to be in the operating state. Alternatively, only one of the dehumidifier 32 and the electric heater 27 may be fixedly controlled to be in the operating state. Only the dehumidifier 32, instead of the window heater 10, for example, may be fixedly controlled to be in the operating state. Only the electric heater 27, instead of the window heater 10, may be fixedly controlled to be in the operating state. In the second embodiment, the entirety of the window heater 10, the dehumidifier 32, and the electric heater 27 is fixedly controlled to be in the operating state. Alternatively, at least one of the fog suppressors may be fixedly controlled to be in the operating state. At least two of the window heater 10, the dehumidifier 32, and the electric heater 27 may be fixedly controlled to be in the operating state. The heating medium heat exchanger 28 which heats air using heat obtained from the device 29 may be used as a fog suppressor. The air conditioning control unit 60 operates, for example, in Step 295, an electric pump which is disposed in a medium circulation path so as to circulate the medium between the device 29 and the heating medium heat exchanger 28. In this case, the windshield 9 is indirectly heated by heat supplied from the device 29, and thus fogging of the windshield 9 is suppressed.

In the embodiments described above, the normal air-blowing mode switch control is executed even in the electric-power restricted state. Alternatively, the control which increases the air volume relative to the defroster air-blowing or fixes the mode to the defroster air-blowing mode may be additionally executed in the electric-power restricted state.

In the embodiments described above, a normal air-flow-rate control is executed in the electric-power restricted state. Alternatively, discharge of the low voltage battery 7 may be suppressed in the electric-power restricted state, by suppressing the air volume.

In the embodiments described above, a normal display control is executed in the electric-power restricted state. Alternatively, a restricted function may be informed to a user, in the electric-power restricted state, in such a manner that the elements subject to fixed control are displayed.

In the embodiments described above, an example having the entirety of the window heater 10, the electric heater 27, the heating medium heat exchanger 28, and the dehumidifier 32 is exemplified as a fog suppressor. However, the configuration having at least one of these may be applied. An additional electric heater, such as a steering heater for heating a steering wheel, can be applied as a low voltage device 8, instead of or in addition to the seat heater 33. The medium heater 30 may have a configuration in which the medium heater 30 is a low voltage device 8 and receives the electric-power from the low voltage battery 7 and may be used as a fog suppressor.

In the embodiments described above, whether the electric vehicle is in the electric-power restricted state is determined in Step 172 and Step 173 and this constitutes a branch to Step 190. Alternatively, the branch to Step 190 may be constituted by only Step 173, without the need for Step 172. It can be determined whether the electric vehicle is in the electric-power restricted state, through only the control operation of Step 173. In this case, the fixed control is executed by the fixed control portion 65, in accordance with the low electric storage amount state of the high voltage battery 2.

What is claimed is:

1. An electric vehicle air-conditioning device comprising:
    a refrigeration circuit having an electric compressor to which electric-power is supplied from a high voltage battery, the high voltage battery supplying electric-power to an electric motor for travel of an electric vehicle;
    an interior/exterior air switching device switching a mode between an exterior-air mode in which exterior-air is introduced from an outside of the electric vehicle and an interior-air mode in which interior-air of a vehicle cabin is circulated;
    a fog suppressor to which electric-power is entirely supplied from a low voltage battery that supplies electric-power to devices that are operated at a voltage lower than that of the high voltage battery, the fog suppressor suppressing fogging of a windshield of the electric vehicle;
    a sensor detecting fogging of the windshield;
    a determination portion determining whether the electric vehicle is in an electric-power restricted state in which the electric compressor is to be restricted from consuming electric-power from the high voltage battery; and
    a fixed control portion controlling the electric compressor to stop, and controlling the fog suppressor to be in an operating state regardless of a signal from the sensor, when the determination portion determines that the electric vehicle is in the electric-power restricted state.

2. The electric vehicle air-conditioning device according to claim 1, further comprising:
    a normal state control portion controlling the devices, which includes the fog suppressor, when the determination portion determines that the electric vehicle is not in the electric-power restricted state, wherein
    the normal state control portion controls the devices, excluding the fog suppressor, when the determination portion determines that the electric vehicle is in the electric-power restricted state.

3. The electric vehicle air-conditioning device according to claim 2,
    wherein the normal state control portion performs feedback-control on the devices to suppress fogging of the windshield based on the signal from the sensor.

4. The electric vehicle air-conditioning device according to claim 1, wherein
    the determination portion includes
        a first determination portion determining whether a battery control unit, which controls the high voltage battery, prevents use of the electric compressor; and
        a second determination portion determining whether remaining power of the high voltage battery is less than a predetermined threshold, wherein
    when the battery control unit prevents use of the electric compressor and the remaining power is less than the threshold, the determination portion determines that the electric vehicle is in the electric-power restricted state.

5. The electric vehicle air-conditioning device according to claim 1,
    wherein the fog suppressor has a window heater that directly heats the windshield.

6. The electric vehicle air-conditioning device according to claim 1, wherein
    the fog suppressor has an air heating device that heats air blown into the vehicle cabin to indirectly heat the windshield.

7. The electric vehicle air-conditioning device according to claim 6, wherein
    the air heating device has an electric heater that heats the air blown into the vehicle cabin.

8. The electric vehicle air-conditioning device according to claim 6, wherein
    the air heating device has a heating medium heat exchanger that heats the air blown into the cabin of the vehicle with a medium.

9. The electric vehicle air-conditioning device according to claim 1, wherein
    the fog suppressor has a dehumidifier that dehumidifies air in the vehicle cabin.

10. The electric vehicle air-conditioning device according to claim 1, wherein
    the fixed control portion controls the interior/exterior air switching device to be in the exterior-air mode, when the determination portion determines that the electric vehicle is in the electric-power restricted state.

11. The electric vehicle air-conditioning device according to claim 1, wherein
when the determination portion determines that the electric vehicle is in the electric-power restricted state, the fixed control portion controls the electric compressor to stop and then immediately thereafter controls the fog suppressor to be in an operating state.

12. The electric vehicle air-conditioning device according to claim 1, wherein
the windshield is continuously heated.

* * * * *